United States Patent [19]
Andersson et al.

[11] Patent Number: 5,500,671
[45] Date of Patent: Mar. 19, 1996

[54] VIDEO CONFERENCE SYSTEM AND METHOD OF PROVIDING PARALLAX CORRECTION AND A SENSE OF PRESENCE

[75] Inventors: Russell L. Andersson, Manalapan; Tsuhan Chen, Middletown; Barin G. Haskell, Tinton Falls, all of N.J.

[73] Assignee: AT&T Corp., Murray Hill, N.J.

[21] Appl. No.: 328,640

[22] Filed: Oct. 25, 1994

[51] Int. Cl.⁶ .............................. H04N 7/14; H04M 11/00
[52] U.S. Cl. .................................................. 348/15; 348/20
[58] Field of Search .......................................... 348/15–20

[56] References Cited

U.S. PATENT DOCUMENTS

| | | | |
|---|---|---|---|
| 4,054,908 | 10/1977 | Poirier et al. | |
| 5,412,417 | 5/1995 | Tozuka | 348/20 |
| 5,430,473 | 7/1995 | Beecher, II et al. | 348/20 |
| 5,438,357 | 8/1995 | McNelley | 348/20 |

OTHER PUBLICATIONS

W. J. Welsh, S. Searby and J. B. Waite–"Model–Based Image Coding" pp. 195–244.
Baluja, S. & Pomerlau, D. A. (1994)–"Non–Intrusive Gaze Tracking Using Artificial Neural Networks".
Shaker Sabri & Birendra Prasada–"Video Conferencing Systems"–pp. 238–255, Apr. 1985.
Alan L. Yuille, David S. Cohen and Peter W. Hallinan–"Feature Extraction From Faces Using Deformable Templates", 1989 IEEE pp. 104–109.

Primary Examiner—Wing F. Chan
Attorney, Agent, or Firm—Brian K. Dinicola

[57] ABSTRACT

A video conference system provides eye contact and a sense of presence to a plurality of conference participants located in respective remotely-sited conference rooms. Each conference room contains at least one video telephone or communications device that includes a video camera for generating video signals indicative of a sequence of local conferee image frames, and an image receiver for displaying image frames of at least one remote conferee. The image receiver, the video camera, and the eyes of the local conferee define a parallax angle. The video conference system further includes a frame generating system, responsive to the video signals, for analyzing local conferee image frames and generating a corresponding sequence of parallax-compensated frames. A signal indicative of each respective sequence of parallax-compensated frames is transmitted to a corresponding image receiver, whereby apparent eye contact is provided between each local conferee and a displayed image of a corresponding remote conferee. Where more than three conferees are involved, each input image frame is additionally analyzed for head position and the head position is reoriented by the frame generating system as necessary to provide a sense of presence.

10 Claims, 5 Drawing Sheets

VIDEO CONFERENCE SYSTEM AND METHOD OF PROVIDING PARALLAX CORRECTION AND A SENSE OF PRESENCE

FIELD OF THE INVENTION

The present invention relates generally to video conferencing, and more particularly, to a video conference system and technique in which the appearance of eye contact is provided between each viewer and the corresponding image or images of remote persons being viewed.

BACKGROUND OF THE INVENTION

One of the main objectives of a video conferencing system is to provide an effective vehicle for interaction between remote persons. The ability to see and interact with different conference participants is essential to the conduct of any meeting. Visual presence is therefore one of the most important criteria a video conferencing system must satisfy. It is also desirable to see who is looking at whom during the meeting.

All video conference systems utilize, at each site, at least one monitor and at least one camera for displaying the remote conferee(s) and for obtaining an image of the local conferee(s). A persistent problem which arises from current configurations of these components in a video conferencing system is the so-called "parallax effect", which prevents the appearance of eye contact between the speaker and those remote viewers to whom he or she is speaking. Essentially, this effect results from the placement of the camera relative to the monitor and viewer.

The parallax effect is illustrated in FIG. 1. As seen in FIG. 1, each of conference participants A and B views a respective display 12, 14, having a windows for presenting the image of the other participant. Associated with each display is a video camera for capturing the image of the corresponding viewer. Each camera may be placed above, below, or to either lateral side of the associated display. In the illustrative prior art system shown in FIG. 1, cameras 16 and 18, respectively, are placed directly above displays 12 and 14. The angle θ represents the angle between camera 16 and display 12 relative to viewer A. Because participant A is looking directly at the displayed image of participant B, and therefore not at camera 16, the displayed image of A appears to be looking down. The parallax effect has a similar impact on the displayed image of participant B.

As will be readily ascertained by those skilled in the art, the parallax effect can be minimized by placing the camera and monitor as close together as possible. In fact, previous efforts to eliminate the parallax effect have relied upon positioning the camera directly behind a specially constructed display screen. In U.S. Pat. No. 4,054,908 issued to Poirier et al on Oct. 18, 1977, for example, the image of the observer is reflected to the camera lens by an oblique reflecting plate. The display screen is viewed by the observer through a window in the reflecting plate. The presence of the window in the apertured plate, however, is somewhat distracting to the viewer. It has also been proposed to utilize an electronic crystal screen which alternates between opaque and transparent states at a frequency slow enough to permit an image of the viewer to reach the camera while in the transparent state and to present a displayed image while in the opaque, reflecting state. Disadvantageously, images displayed on such a flashing screen are characterized by unacceptably low brightness. Moreover, the screen structure and associated driving circuitry are costly to fabricate.

So-called virtual space video conferencing systems have been proposed in an effort to provide full visual presence and convey the spatial relationship between provide three or more conference participants. In this type of system, the number of monitor and camera pairs at each site corresponds to the total number of remote conference participants, and the relative positions of the pairs relative to each participant are fixed at each site. An illustrative system of this type is depicted in FIG. 2. Each viewing subject (A,B,C, and D) sits in a swivel chair in a corresponding room (1,2,3, or 4) with three TV monitors representing the other three "virtually present" participants. Thus, for example, the viewing subject (A) sits in a swivel chair in Room 1 with three TV monitors representing the three "virtually present" participants (B,C, and D). The arrangement of monitor/camera pairs in each room duplicates the positions of each participant as if they were all seated at the same square table. The signals from these cameras pass through video switching units and are directed to corresponding destination monitors by a dynamic allocation network.

The virtual space system of FIG. 2 provides three or more participants with the ability to see who is looking at whom during a conference. Eye contact between the participants, however, has heretofore been obtained by resort to the apertured or semi-reflecting screen devices discussed above. Moreover, the large number of video channels needed to provide the desired spatial distribution between the conference participants translates into a large expenditure of transmission bandwidth.

SUMMARY OF THE INVENTION

The system and process of the present invention overcomes the aforementioned disadvantages by using real-time image analysis and processing techniques to provide meaningful head orientation and/or eye contact in the images presented to the remote viewer. A video conferencing system constructed in accordance with the present invention includes, in each conference room, at least one video telephone that includes a video camera for generating video signals indicative of a sequence of local conferee image frames, and an image receiver for displaying image frames of at least one remote conferee. The image receiver, the video camera, and the eyes of the local conferee define a parallax angle. The video conference system further includes a frame generating system, responsive to the video signals, for analyzing local conferee image frames and generating a corresponding sequence of parallax compensated frames. A signal indicative of each respective sequence of parallax compensated frames is transmitted to a corresponding image receiver, whereby eye contact is provided between each local conferee and a displayed image of a corresponding remote conferee.

If more than two conferees are involved, each input image frame is analyzed for head position and reoriented, as necessary, by the frame generating means to provide a sense of presence. Illustratively, each image receiver may present two remote conferees on a split window display. Each input image frame is mapped onto a three dimensional ellipsoid head model, reoriented by a predetermined angle to obtain the proper gaze direction, and recapped onto a two dimensional reconstructed image frame. A signal representing the reconstructed image frames is then presented to the appropriate remote image receivers. Thus, in accordance with the present invention, it is possible for each conferee to discern who is looking at whom during the conference.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 3A:
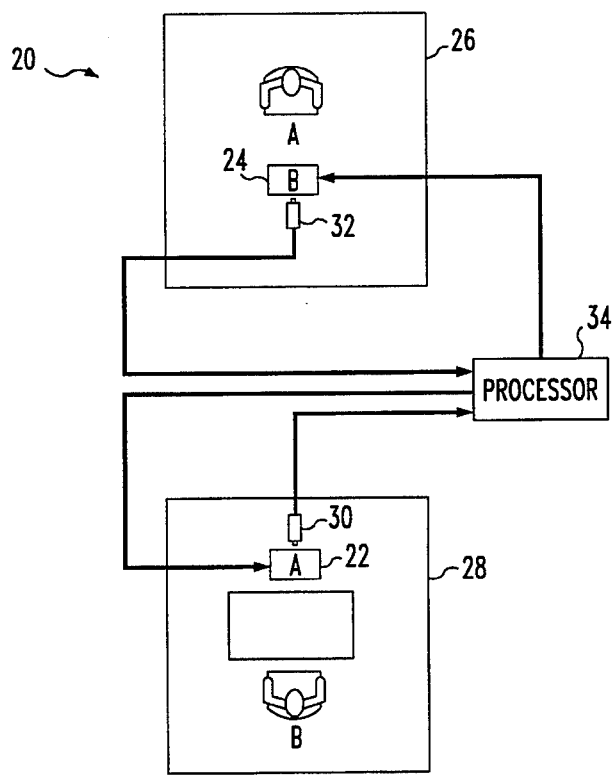
FIG. 3A is a block diagram depicting a video conferencing system constructed in accordance with an illustrative embodiment of the present invention.

A conferencing system 20 constructed in accordance with an illustrative embodiment of the present invention is depicted in FIG. 3A. As seen in FIG. 3A, each participant in a video teleconference views a respective display 22, 24. Each display may be divided into one or more windows for presenting the image of a corresponding number of remote participants. Illustratively, there may be two conference sites with one conference participant at each site. Thus, in FIG. 3A, participants A and B are shown both at corresponding conference sites 26, 28 and as they appear on displays 22 and 24, respectively.

In the illustrative embodiment depicted in FIG. 3A, the images of conference participants A and B are initially obtained by video cameras 30 and 32, respectively. In a conventional manner, the analog output signals of cameras 30 and 32 are converted to a digital form, pre-processed, and encoded for bit rate reduction to facilitate transmission over or via a telecommunication network (not shown). Systems and techniques for performing the aforementioned signal processing functions are well known and are not deemed to constitute a novel aspect of the present invention; accordingly, a detailed description of the same is believed unnecessary and has been omitted.

With continued reference to FIG. 3A, it can be seen that the digitized video signals from each camera are not transmitted directly to the associated destination display. Rather, and for a purpose which will now be explained, the outputs of cameras 30 and 32 are supplied to a suitable processing device 34, such for example as a high processing speed computer. Essentially, processing device 34 provides frame by frame analysis, in real time, of the raw incoming video data that it receives and modifies the image of each incoming frame so as to restore eye contact between the displayed image and the observer. The modified frames are then transmitted, in real time, to the appropriate destination display.

Figure 1:
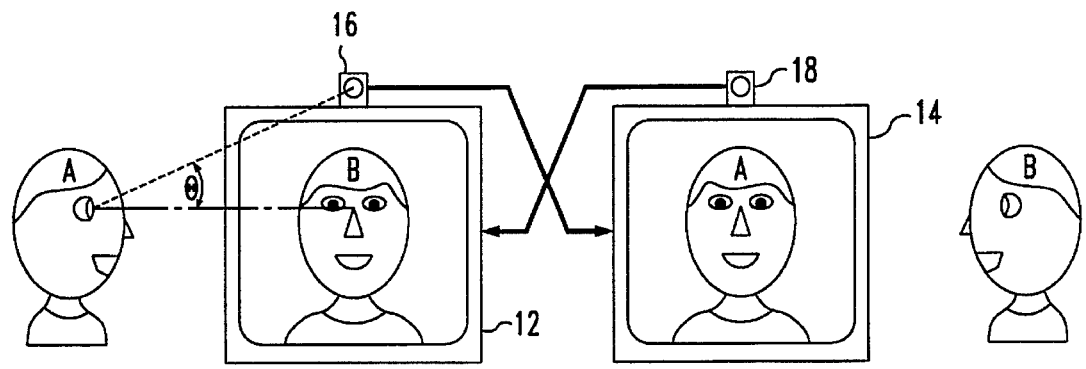
FIG. 1 depicts the operation of a conventional single person camera (SPC) video conferencing system.
Figure 2:
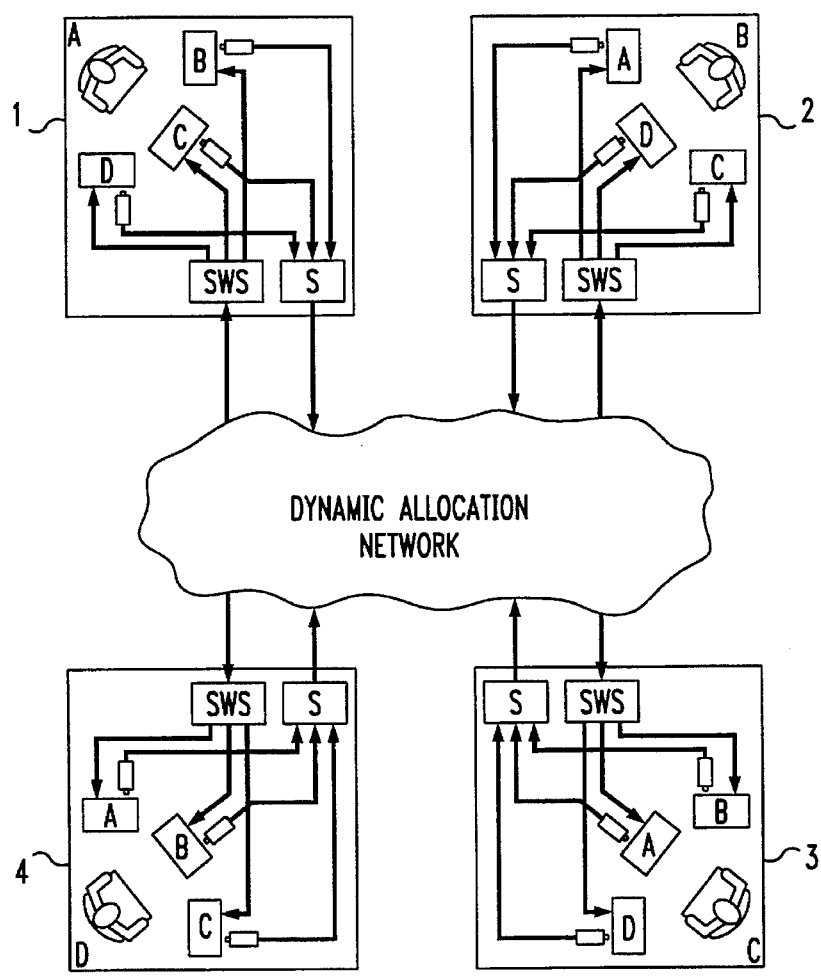
FIG. 2 depicts a conventional virtual space video conferencing system.

As was discussed above with reference to FIG. 1, the positioning of the camera directly above the display results in the formation of a parallax angle Θ between the camera, the eyes of observer A, and the displayed image of participant B. This arrangement of camera, display, and observer is repeated in FIG. 3B. Although each camera is shown as being positioned above its corresponding display, it will be readily appreciated by those skilled in the art that the cameras may be positioned below or at either lateral side of the display, as well. In accordance with the present invention, parallax correction is performed by processing device 34. For this purpose, it is first necessary to determine the parallax angle Θ.

In order of increasing precision, there are several ways to determine the parallax angle Θ. In the illustrative embodiment of FIGS. 3A and 3B, the images of only two conference participants, looking straight ahead, need be modified. Assuming that movements of A and B are negligible, a fixed angle Θ can be determined based on the relative positions of the camera and the display. Alternatively, if it is assumed that the image of B on display A does not move very much, then the image taken by camera A may be analyzed to determine the amount of correction needed for A's image to face straight ahead. The amount of correction required, denoted as φ, can be modeled as a random variable with a certain probability distribution, stationary or time varying. With the assumption that A is looking at the image of B most of the time, the parallax angle Θ can be equated with the expectation value of φ, i.e. E[φ].

When employing either of the above-mentioned lack-of-movement assumptions, it is only necessary to locate the eyes in each image frame and to modify the frames to correct for the parallax angle Θ. Feature extraction techniques for locating facial features such as the eyes, nose and mouth in a digitized image are well known and are not described in detail here. Similarly, techniques for modifying localized areas of such images are known to those skilled in this art. In any event, because the eyes occupy only a small portion of the entire face or image thereof, the task of turning the eyes forward can be done by simply synthesizing the eyes. The feasibility of eye synthesis relies on the natural tolerance of the human viewer to minor noise in the relatively small region of the eyes. In this regard, it should be noted that the position of the camera relative to the display affects the complexity of the eye synthesis algorithm as well as the quality of the results obtained. Specifically, the eye lid positions are significantly affected by the vertical component of the gaze direction, so that if the eyes had to be moved vertically, as would those in the displayed image of B, the lid would also have to be altered to avoid perceptual incongruity. With the camera to the side of the display, lid position does not have to change as the eye is synthesized. Accordingly, a camera position to the side of the display is especially preferred.

In order to synthesize an image of the eye, the program must determine the boundary of the surrounding lids. The lids primarily adjoin the white, but often also adjoin the iris at the top and bottom. The entire region within this boundary is synthesized. If the subject is far away from the camera (so that the eyes in the obtained image are very small), the position of the pupil needed to provide eye contact with the observer can be established merely by adding a properly sized, dark circular region at the corrected position.

If the subject is sufficiently close to the camera/monitor, completely new intensity values may be created for each pixel position within the outline of the eye, that is, between the upper and lower lids. In addition to the eye's outline, five additional parameters are utilized to synthesize a new eye: the two coordinates of the pupil's center, the iris radius, the iris intensity level, and the white's intensity level. A boundary detection method naturally results in a simple boundary representation containing the minimum and maximum iris X coordinates for each Y value within a range. The iris intensity is computed during the basic eye tracking algorithm, and similarly the white intensity and eye outline are computed during the eye white boundary determination. Illustratively, eye synthesis may be performed in accordance with a parametric mixing function approach in which the iris diameter is proportional to the eye-to-eye distance. The eye-to-eye distance provides the proper scaling as the subject moves closer to and farther away from the camera.

Figure 4:
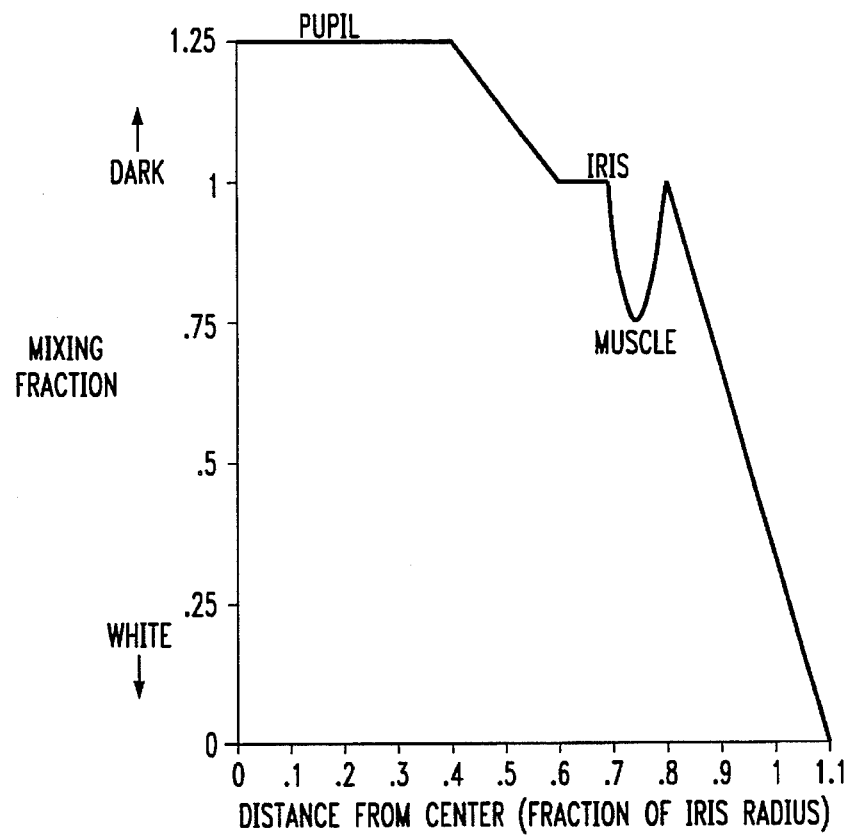
FIG. 4 is a graphical representation of a look up table for providing pixel values in accordance with an eye synthesis technique utilized by the present invention.

As discussed above, a fixed angle $\Theta$ can be determined based on the relative positions of the camera and the display. Illustratively, the camera may be positioned to one side of the display and at the same height. For purposes of the present invention, it may be assumed that the user is looking at the display and not somewhere else. Thus, if the user looks somewhere else, the synthesized image no longer appears to maintain eye contact with the viewer. With the camera and display arranged in this manner, the iris and pupil may be shifted horizontally by a certain geometry-dependent amount, with no vertical motion. The magnitude of the shift is inversely proportional to the eye-to-eye distance. Illustratively, the synthesizing algorithm may be configured to compute the distance to the synthesized pupil center, in aspect-ratio-corrected horizontal pixels. A look up table, based on the ratio of this distances to the synthesized iris radius, supplies a mixing coefficient between the iris level and the white level: 1 specifies the iris level and 0 specifies the white level, with linear mixing in between. A graphical representation of the look-up table is shown in FIG. 4. The entries above 1 produce an even darker level for the pupil. The synthesis of the white may utilize a similar process.

As will be readily appreciated by those skilled in the art, an eye image synthesized in the above described manner will lack the reflected highlight which gives the eye an impression of depth and contour. As such, it may be desirable to add such highlights to the image in a conventional manner. Utilizing a Motorola 88000 RISC processor to perform the aforementioned image analysis and processing operations on a single input video frame, it took 1.177 msec to locate the pupil and white boundaries, 0.176 msec to post process the boundaries, 1.670 msec to synthesize the new eyes, and 1.453 msec to generate real-time graphics and text displays. Of course, the processor times are sensitive to the eye's image in the image plane. However, even with extreme close-ups, it is possible to generate a modified image frame having synthesized eyes within one frame interval. As a result, a sequence of parallax compensated image frames may be generated in real-time to advantageously provide the users of a video conferencing system with eye contact without sacrifices in frame rate.

It may not be possible to utilize the aforementioned assumptions as to the movements of A and B. If compensation for the exact parallax angle $\Theta$ is required, it is necessary to detect A's eye position and B's eye position on display 24. Any suitable image analysis technique may be utilized to detect the eye positions for the purposes of the present invention. By way of illustrative example only, a non-intrusive gaze tracking technique that may be utilized to obtain eye position information is described by S. Baluja and D. A. Pomerleau in an article entitled "Non-Intrusive Gaze Tracking Using Artificial Neural Networks", 6 Advances in Neural Information Processing Systems (NIPS) (1994). It should be noted that a non-intrusive gaze technique is preferred so that each conference participant may move his or her head freely.

Essentially, the goal of gaze tracking is to determine where a subject is looking from the appearance of the subject's eye. In order to account for shifts in the relative positions of the camera and eye, the eye is first located in each image frame. Typically, one of the eyes is located by searching for the specular reflection of a stationary light source in the image of the subject's face. Although any suitable light source may be utilized for the purposes of the present invention, a non-intrusive infrared source is preferred since it provides an easily detected reflection pattern without creating a distraction or otherwise causing discomfort to the viewer. The specular reflection in the image can usually be distinguished by a small bright region surrounded by a very dark region. The reflection location may be utilized to limit the search for the eye in the next frame. A window surrounding the reflection is extracted and the image of the eye is located within this window. The center of the pupil is found and the relative position of the light's reflection to the pupil's center is calculated. The gaze direction is determined from information about the relative positions. For example, when the observer is looking at the light source, the specular reflection is at the center of the pupil image. If the observer is looking above the light, the specular reflection is near the bottom edge of the pupil image. If the observer is looking to the left of the light, the specular reflection is near the right of the pupil image, and so on.

Figure 3B:
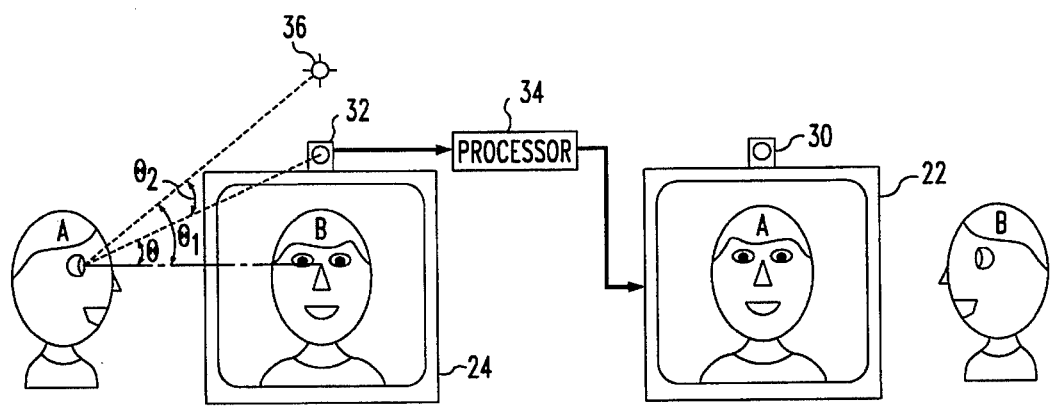
FIG. 3B is an elevational view depicting the video conferencing system of FIG. 3A.

In the illustrative system depicted in FIGS. 3A and 3B, a fixed light source 36 is positioned above camera 32 to facilitate the use of a gaze tracking technique on the image of participant A. A similar light source (not shown) is positioned above camera 30. As will be readily appreciated by those skilled in the art, a gaze detection technique such as the one discussed above provides useful information concerning the direction of the eye relative to the light source. As will now be explained, this information may be used to determine the parallax angle $\Theta$. Specifically, and as best seen in FIG. 3B, light source 36, participant A, and the displayed image of participant B define angle $\Theta_1$, while the light source 36, participant A, and camera 32 define angle $\Theta_2$. Parallax angle $\Theta$ may thus be calculated by taking the difference between $\Theta_1$ and $\Theta_2$. Once the parallax angle is known, generation and transmission of a revised image frame is performed in the same manner as described above.

Figure 5:
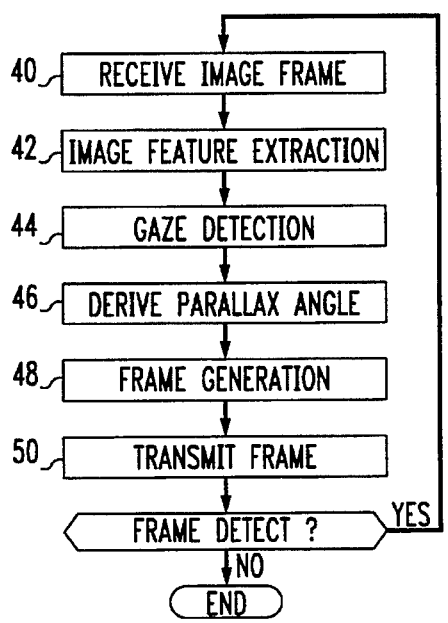
FIG. 5 is a flowchart depicting the steps of an inventive image analysis and processing technique by which parallax correction is provided in accordance with the present invention.

An illustrative sequence of steps for performing parallax correction with a video conferencing system such as that depicted in FIGS. 3A and 3B is shown in FIG. 5. Although the discussion will proceed in connection with the processing of images of only one participant, it will be readily apparent that the same image analysis and processing steps are simultaneously performed for all conference participants. In any event, a digitized video frame of participant A is received by processing device 34 (step 40) and image feature extraction is performed to locate the eyes in the image (step 42). During step 44, gaze detection is performed on the image to detect the direction in which the subject is looking relative to the camera. The parallax angle is derived (step 46) and a revised image frame is generated (step 48) in which the positions of the pupils and, if appropriate, the irises correspond with the positions needed for eye contact with observing participant B. The revised image frame is then transmitted to display 22 (step 50) where it is viewed by participant B. The aforementioned steps are performed, in real time and frame by frame for each video signal input, so that eye contact is provided between the displayed images and the respective participants.

When more than two conference sites and/or participants are involved, additional considerations besides the need to provide eye contact between the participants must be addressed in order for a video conferencing system to preserve the look and feel of a live meeting. Specifically, and as already discussed above, it is also important for each participant to see who is talking to whom. Thus, in accordance with the teachings of the present invention, real-time image analysis and processing techniques are utilized to reorient the head image as well as to provide the conference participants with the appearance of eye contact.

FIG. 6 again depicts a video conferencing system 60 constructed in accordance with the present invention and similar to the system 20 of FIG. 3A. The system illustrated in FIG. 6, however, has been modified to provide a conference between three participants A, B, and C at three different sites. System 60 therefore includes three respective displays 62, 64, and 66, and three corresponding cameras 68, 70, and 72. A light source, only one of which is shown and indicated generally at 76, is positioned above each camera. Each of the displays are divided into two windows, with each window presenting the image of two remote participants. In a manner identical to that discussed above, the video signals from each camera are digitized, processed and transmitted to a processing device such as the processing device 74.

Figure 6:
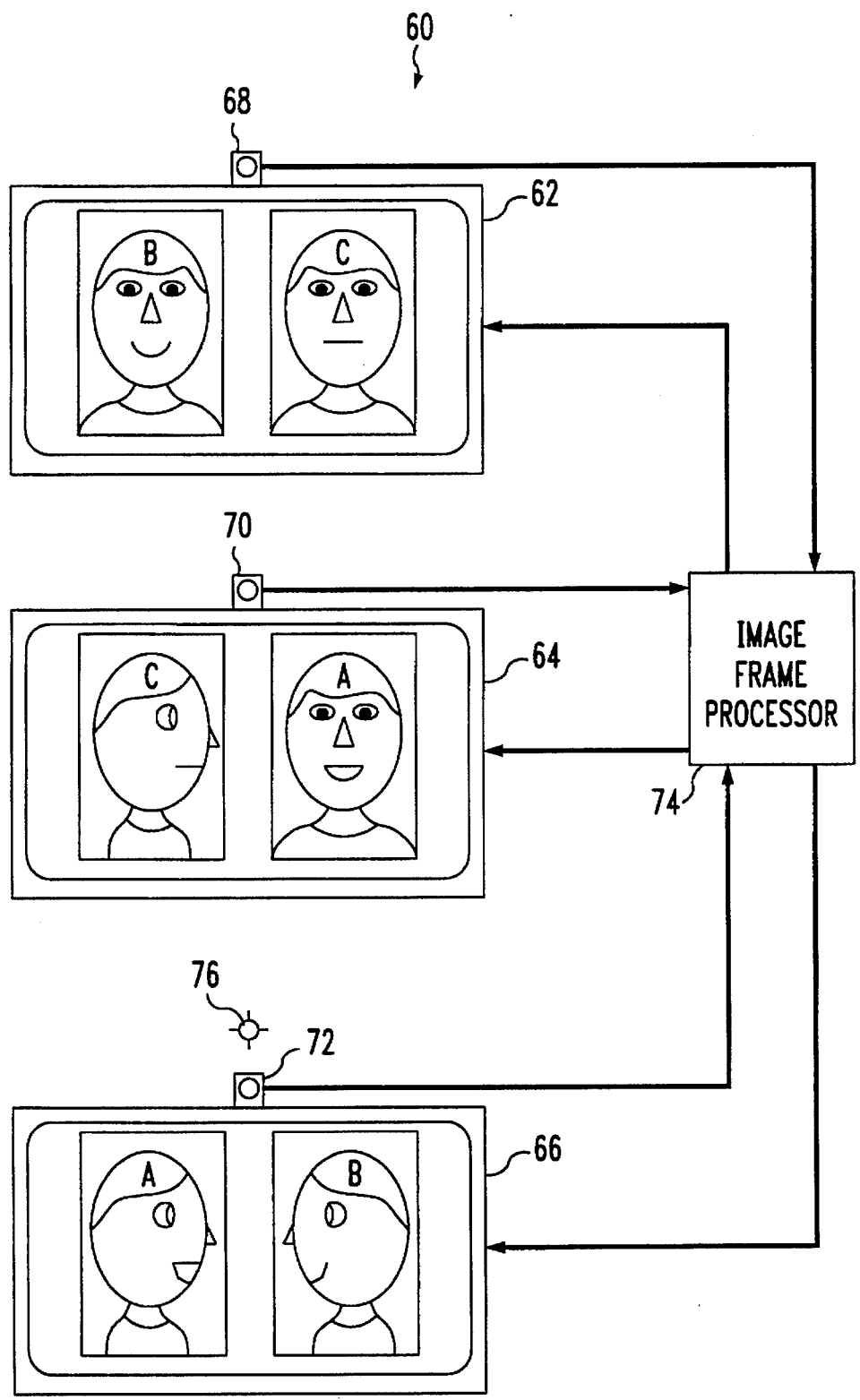
FIG. 6 is an elevational view illustrating the operation of a video conferencing system providing a sense of presence between three participants in accordance with the invention.

At the point of the video teleconference depicted in FIG. 6, A is speaking to B. In an actual conference, A would be looking at B, and both B and C would be looking at A. Since each participant, absent the additional image processing of the invention, is facing straight ahead at his or her display, however, the respective images presented to the other participants will not preserve the corresponding head orientations. To obtain the proper orientations depicted in FIG. 6, varying amounts of image analysis and processing must be performed, as will now be described.

While A is looking at the window of B on display 62, A should see the images of B and C facing straight ahead (i.e. facing A). Since B and C are already facing their own cameras, only parallax error correction of their eye positions is required. Such error correction may be performed utilizing any of the techniques described above in connection with FIGS. 3A and 3B. On display 64, B should see the image of A facing straight ahead, and the image of C facing the image of A. While only parallax error correction of A's image is required for display 64, the image of C additionally requires reorientation to achieve the position shown in FIG. 6. Similarly, on display 66, C should see A and B facing each other. Thus, the images of both A and B require at least head reorientation to achieve the positions depicted in FIG. 6.

Figure 7:
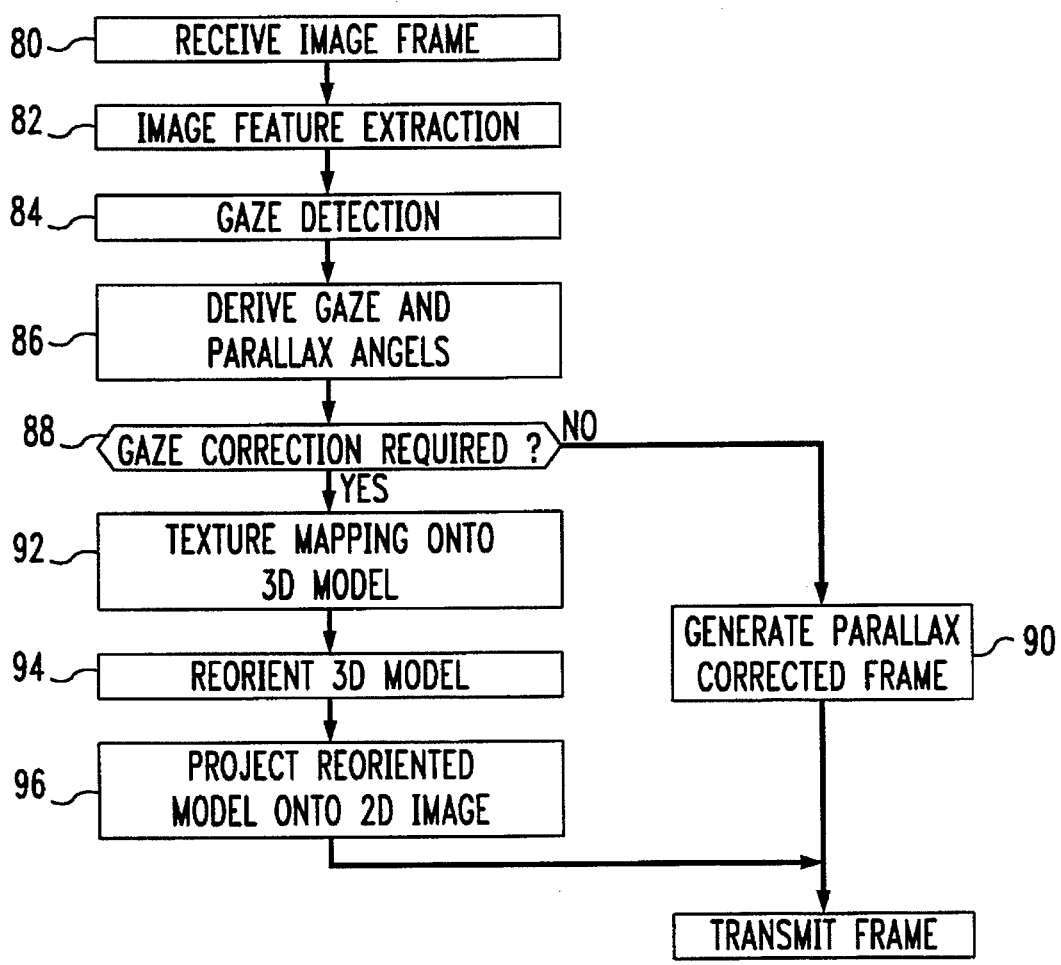
FIG. 7 is a flowchart depicting the steps of a modified image analysis and processing technique by which parallax correction and head reorientation are performed to reproduce a sense of presence during operation of the system of FIG. 5.

A process for performing head reorientation and parallax correction in accordance with an illustrative embodiment of the present invention is depicted in the flow chart of FIG. 7. A digitized video frame of a conference participant such, for example, as participant C is received by processing device 74 (step 80) and image feature extraction is performed to locate the eyes in the image (step 82). During step 84, gaze detection is performed on the image to detect the direction in which the subject is looking relative to the camera. When participant C is looking at participant A, for example, the specular reflection of light source 76, in the image of participant C's eye as obtained by camera 72, will be above and to the right of the center of the pupil.

As discussed above, the parallax angle $\Theta$ can be computed from this information given the fixed position of camera 72 and display 66 (step 86). More significantly, however, the position of the specular reflection relative to the pupil center may be utilized to detect which image is being watched by the observing participant (step 88). In the present example, the location of the specular reflection to the right of the pupil center in the received image of participant C suggests that C is looking to the left, and therefore at participant A.

Once it is known which display window is being viewed by each conference participant, image processing is performed to generate respective, corrected image frames that are appropriate for each destination display. If only parallax correction is required, as determined at step 88, a first frame is generated for transmission to the appropriate display(s) (step 90). In the illustrative example depicted in FIG. 6, a frame indicative of the parallax corrected, forward-facing image of C is presented to display 62. Because reorientation of C's head is required to convey a sense of presence to participant B, however, several additional processing steps must now be performed.

The face image of each frame is texture mapped onto a three dimensional (3-D) head model (step 92). Illustratively, a relatively simple ellipsoid head model may be employed for this purpose. Of course, it will be readily appreciated by those skilled in the art that other, more sophisticated 3-D models, may also be employed, depending upon the processing power and speed of execution limitations imposed by the specific application. By way of additional example, a wire frame model as disclosed by K. Aizawa, H. Harashima, and T. Saito in a paper entitled "Model-based Analysis Synthesis Image Coding System for a Person's Face", *Signal Processing Image Communication*, vol. 1, no. 2, October 1989, pp. 139–152, may be utilized. In any event, the resulting three-dimensional, textured model is rotated in the appropriate direction by a predetermined angle $\alpha$ (step 94) and the texture of the ellipsoid model is projected back to the 2D viewing plane to produce the revised image (step 96). The thus generated image is then transmitted to the appropriate destination display(s), as shown in step 98. In the illustrative example depicted in FIG. 6, the image of C presented to display 64 has been rotated 90° to the right to face in the direction of the displayed image of participant A. The eyeballs of image C can be independently modelled in a similar manner or synthesized in connection with the pure parallax correction technique discussed above.

Along with video coding, parallax correction and/or head orientation can be performed at the respective conference sites as preprocessing or postprocessing. In either case, image analysis is preferably performed before coding of the original image signals so that no critical image information is lost prior to analysis. Synthesis of images corrected in accordance with the present invention, however, may be performed anywhere. In the pre-processing case, the image is digitized, analyzed, synthesized/processed, coded, and transmitted. Because different processed images must be sent to different participants, a large amount of transmission bandwidth is required. In the post-processing case, the parallax angle and head orientation information of each participant obtained by image analysis must be sent along with the coded video signals. Synthesis may then be performed at the receiver end, or in some centralized location.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method for establishing a video conference between a plurality of remotely located conference rooms each containing at least one conferee, a video camera, and an image receiver, the image receiver, video camera, and eyes of each conferee associated therewith defining a parallax angle of said each conferee, comprising the steps of:

generating, with a first video camera, a video signal representative of a sequence of input image frames of a first conferee;

analyzing said input conferee image frames, in real time, to determine a parallax angle in each frame;

generating a corresponding sequence of parallax-compensated image frames; and transmitting a signal indicative of said sequence of parallax-compensated image flames to an image receiver viewed by a second conferee, whereby eye contact is provided between said second conferee and a displayed image of said first conferee.

2. The method according to claim 1, wherein said analyzing step includes locating, in an image of said first conferee, a specular reflection of a fixed light source in a pupil of the first conferee.

3. The method according to claim 2, wherein said analyzing step further includes measuring a position of said specular reflection relative to the center of said pupil.

4. The method according to claim 1, wherein said generating step includes synthesizing at least a portion of each parallax-compensated image frame from an input conferee image frame.

5. The method according to claim 1, wherein a gaze direction of said first conferee is also obtained during said measuring step and wherein said generating step further includes texture mapping each input conferee image frame onto a three dimensional ellipsoid facial model and reorienting said facial model to achieve a facial orientation selected in accordance with said gaze direction.

6. A video conference system connecting a plurality of remotely located conference rooms, each room containing at least one of a plurality of conferees, comprising:

at least one video telephone in each room comprising a video camera for generating video signals indicative of a sequence of image frames of a first conferee and an image receiver for displaying image frames of at least a second conferee, said image receiver, said video camera, and eyes of said first conferee defining a parallax angle;

frame generating means, responsive to said video signals, for analyzing input image frames of said first conferee and for generating a corresponding sequence of parallax-compensated image frames of said first conferee; and means for transmitting a signal indicative of said sequence of parallax-compensated frames to at least one remote image receiver, whereby eye contact is provided between at least said second conferee and a displayed image of said first conferee.

7. The system according to claim 6, further including a fixed light source in each room for producing a specular reflection on the eyes of the conferee in said each room.

8. The system according to claim 7, wherein said frame generating means is operative to analyze said input conferee image frames and detect a gaze direction of said first conferee.

9. The system according to claim 8, wherein said frame generating means is operative to generate a second image frame for transmission to at least a third conferee, said frame generating means being responsive to a detected gaze direction to texture map each input conferee image frame onto a three dimensional ellipsoid facial model and reorient said facial model to achieve a facial orientation selected in accordance with said detected gaze direction.

10. The system according to claim 9, wherein said transmitting means is operable to transmit a first sequence of parallax corrected image frames representative of said first conferee to an image receiver positioned proximate a second conferee and to transmit a second sequence of gaze direction-compensated image frames representative of said first conferee to an image receiver positioned proximate a third conferee, thereby providing a sense of presence between said first, second, and third conferees.

* * * * *